Oct. 20, 1953  A. W. WARNER, JR  2,656,473
CRYSTAL UNIT FOR USE AT HIGH TEMPERATURES
Filed May 24, 1950  2 Sheets-Sheet 1

INVENTOR
A. W. WARNER, JR
BY
ATTORNEY

Oct. 20, 1953

A. W. WARNER, JR 2,656,473

CRYSTAL UNIT FOR USE AT HIGH TEMPERATURES

Filed May 24, 1950

INVENTOR
A. W. WARNER, JR

BY

ATTORNEY

Patented Oct. 20, 1953

2,656,473

UNITED STATES PATENT OFFICE 2,656,473

CRYSTAL UNIT FOR USE AT HIGH TEMPERATURES

Arthur W. Warner, Jr., Fanwood, N. J., assignor to Bell Telephone Laboratories, Incorporated, New York, N. Y., a corporation of New York Application May 24, 1950, Serial No. 163,835

9 Claims. (Cl. 310—8.2)

This invention relates to piezoelectric crystal units, and particularly to such units especially suitable for operation at elevated temperatures.

The invention comprehends a crystal unit structure, and means and methods for manufacturing a complete crystal unit for use at high temperatures, for example about 200° C. or higher.

Piezoelectric crystals have been widely utilized for a number of purposes such as controlling the frequency of oscillation of a variety of types of electronic equipment. In the majority of such applications, operation is at normal room temperature, in the neighborhood of 20° C. when not temperature controlled. Where constant frequency is necessary, elaborate precautions are taken, as by means of insulated thermostatically controlled housings to insure that the crystal temperature shall be held within a very small range, since the frequency of oscillation is directly related to temperature. These expedients, together with crystal orientations which tend to produce minimum variations of the frequencies of oscillation with changes of temperature, permit control to a high order of accuracy.

Certain applications, such as those involving the control of guided missiles, cannot employ the means which will satisfactorily operate at normal room temperatures, since during their period of utilization they may be expected to encounter temperatures ranging up to 250° C., or even higher.

For example, at such elevated temperatures, the crystals which have a nearly zero temperature coefficient over the normal operating ranges are unsuitable. It has been found, however, that specially cut crystals may be successfully employed at these temperatures over a frequency range of substantially one to ten megacycles.

Failure is also experienced with the conventional mountings, and the normal manufacturing procedures are ineffective, in producing crystals operable at temperatures around 200° C. One difficulty is that the solder used to secure the crystal to the supporting wires becomes soft or liquid, and offers excessive damping to the motion of the crystal. If the crystal is cemented, the cement may decompose at the higher temperatures.

In previous practice, a wire mounted crystal for low temperature operation is given a conducting coating before it is soldered or cemented to the supporting wires. The cementing or soldering is carried out at a relatively low temperature, and thereafter the crystal is coated to frequency through a masking device.

This method cannot be used for the manufacture of a crystal which is to be used at high temperatures. The cemented or soldered joint decomposes or softens and loses its permanent bonding characteristics, and introduces excessive damping of the oscillating crystal. At the elevated temperatures at which suitable spotting and soldering material must be fired, the conducting coating is rendered useless by the reaction due to the firing operation. Further, the air pressure within the crystal enclosure or can may build up to about 24 pounds per square inch, an increase of 60 per cent over that at which the can is sealed, and it is to be anticipated that an ordinary solder seal would be punctured or lose its sealing properties as a result of this pressure.

The present invention contemplates the following sequence of steps: first, the crystal blank is "spotted" with a conventional silver paste and fired at 1,000° F.; helical portions of the spring supporting wires are next fixed resiliently to the spots, and a loaded silver paste of a preferred composition to be described hereafter is applied over the helical portions and fired at 1,000° F. for the threefold purpose of mechanical strength, electrical connection, and controlled mechanical damping at the crystal frequency; the bases of the spring supports are then tinned and the assembly placed in a preferred form of mask which will be described in detail hereafter. The crystals are given a conducting coating through the mask, the supporting wires are then soldered to the base of the crystal enclosure, and the crystal is given a loading coating to frequency with the aid of a mask which may be of the type disclosed in the application of the instant inventor, Serial No. 136,070, filed December 30, 1949. The can cover is next placed over the crystal, and the cover crimped loosely to the base. The can is then evacuated and filled with dry air through the loose crimping, crimped tightly, and sealed with a high melting point solder to complete the unit. In certain cases, the initial spotting operation may be omitted.

From the foregoing discussion it may be seen that the objects of the invention include providing a crystal which is operable at elevated temperatures near 200° C. or above.

A further object is to provide a crystal unit which will have a nearly zero temperature coefficient of frequency at about 200° C.

Another object is to provide a method for producing a crystal which will function successfully both mechanically and electrically at elevated temperatures.

A still further object is to provide a masking device for use in the simultaneous application of conducting coating to a plurality of crystals to which mounting wires have already been attached.

Yet another object is the provision of a masking device which will accommodate a plurality of crystals simultaneously for the reception of conducting coating.

The invention may be better understood by reference to the drawing, in which.

Figure 1:
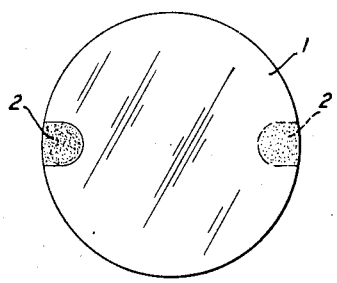
Fig. 1 shows a crystal blank prepared by spotting.
Figure 2:
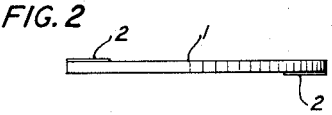
Fig. 2 is an edge view of the blank of Fig. 1.

The crystal blank 1 shown in Figs. 1 and 2 has applied thereto spots 2 of No. 40A silver paste, in the positions to be engaged by the upper helical spring portions 4 of the supporting wires 5. These spots are fired at 1000° F. to establish a firm bond with the crystal. No. 40A silver paste is a conventional mixture having a percentage composition as follows:

53.93% V-9 finely divided and polished silver;
4.69% No. 10 B. T. L. glass;
15.11% Acryloid A-10; and
26.27% Carbitol acetate.

The No. 10 B. T. L. glass is a low melting point mixture having the following percentage composition:

76.5 Red lead;
4.5 Lead fluoride;
1.0 Silicon dioxide; and
18.0 Boric acid.

Acryloid A-10 is a commercially known Rohm and Haas mixture having 30 per cent solids, of methyl methacrylate resin and cellosolve acetate, an ethylene glycol monoethyl ether acetate.

Figure 3:
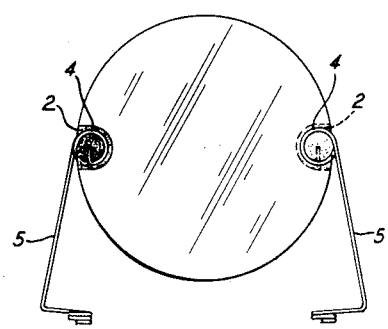
Fig. 3 shows the blank of Fig. 1 with the mounting supports attached resiliently thereto.
Figure 10:
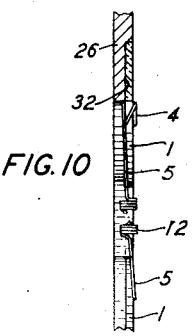
Fig. 10 is a sectional view of the back half of the mask with a crystal in place therein, taken as indicated by line 10—10 of Fig. 8 and with a portion of the mask broken away.

After the spotted and fired blanks have cooled, the helical portions 4 are spread axially to receive the crystal between adjacent turns thereof, as shown in Figs. 3 and 10. The crystal blank illustrated is of the round type, but the method may be used with equal facility with other shapes of blanks, such as the square blank held at diagonally opposite corners which is disclosed in the United States patent to R. A. Sykes, No. 2,392,429. The spots 2 are conveniently placed diametrically opposite each other and on opposite sides of the crystal, and serve as permanent points of attachment for the upper helical spring portions 4 of the supporting wires 5.

Figure 4:
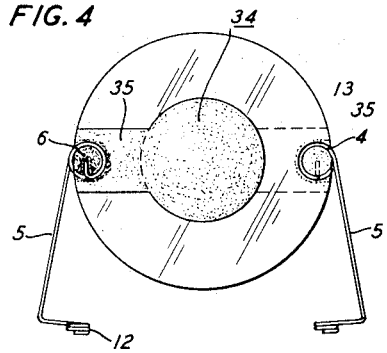
Fig. 4 shows the blank of Fig. 3 with the mounting wires soldered to the silver spots and the conducting undercoating applied.

An improved loaded silver paste having a composition such as the following, or its equivalent, may be used to solder the upper helical portions 4 to the spots 2, as shown in Fig. 4: 25.5 grams of V-9 finely divided and polished silver; 35.5 grams of No. 10 B. T. L. glass; 20 grams of $SiO_2$ ground fine enough to pass through a 325-mesh screen; 12 grams of carbitol acetate, and a sufficient amount of Acryloid A-10 to act as a binder. These ingredients are mixed with a spatula or in a ball mill to form a heavy paste. The silica filler is included to minimize shrinkage, as the resins and carbitol acetate disappear at the 1,000° F. firing temperature. This mixture will not shrink appreciably, but forms a solid joint 6 as it is fired. The fused joint 6 also acts to suppress undesired resonances in the crystal by offering controlled damping, retaining its electrical and mechanical characteristics at high operating temperatures. In some cases the spots 2 may be omitted, and a satisfactory joint obtained by firing the loaded paste directly to the crystal. After cooling the blanks with attached supporting wire are placed in the masking device shown in Figs. 8 and 10, and the conducting coatings 13 applied therethrough, as by the conventional evaporation process.

Figure 5:
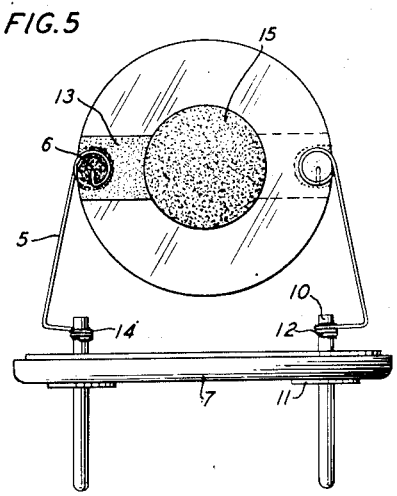
Fig. 5 shows the assembly of Fig. 4 secured to the mounting base after the loading coating has been applied to bring the unit to frequency.
Figure 6:
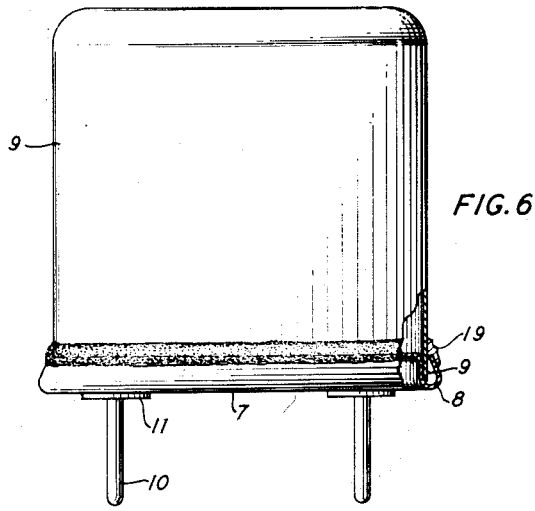
Fig. 6 is an elevational view of an entire unit, which has been partially broken away to illustrate a seal formed in accordance with the preferred method.

The lower ends of wires 5 are tinned, and the mounting wires and coated crystal assembled to the base 7, as shown in Fig. 5. The base 7 is formed of metal and has a groove or moat 8 extending around its periphery, into which the cover 9 will later be fitted. It will of course be understood that the method of producing a high-temperature crystal may be used regardless of the type of mounting, base, or container with which the wire-mounted crystal unit is used.

Contact pins 10 extend through base 7 and are insulated therefrom by suitable sealing joints 11. The supporting wires 5 have lower helical portions 12 with vertically disposed axes formed by their ends, of suitable diameter to be force-fitted over the tops of the pins 10, and to exert a resilient grasp thereon. The helices 12 are also soldered to pins 10 as shown at 14 and the crystal unit is brought to frequency by applying loading coatings 15 with the aid of a mask such as, for example, that described in the Warner application referred to above. After this step the crystal unit is as shown in Fig. 5.

The cover 9 is then set in position in the moat 8, and the latter is crimped lightly thereabout. The loosely closed unit is then evacuated, and placed in a chamber filled with dry air. There is sufficient leakage about the light crimping to permit the initial evacuation, and to allow the subsequent filling with dry air. This may be done at an elevated temperature in some cases. The moat 8 is then crimped hard about the inserted portion of can 9 to make a tight joint and soldered at 19 with a conventional low-melting point solder as an additional precaution to complete the hermetically sealed unit.

Figure 7:
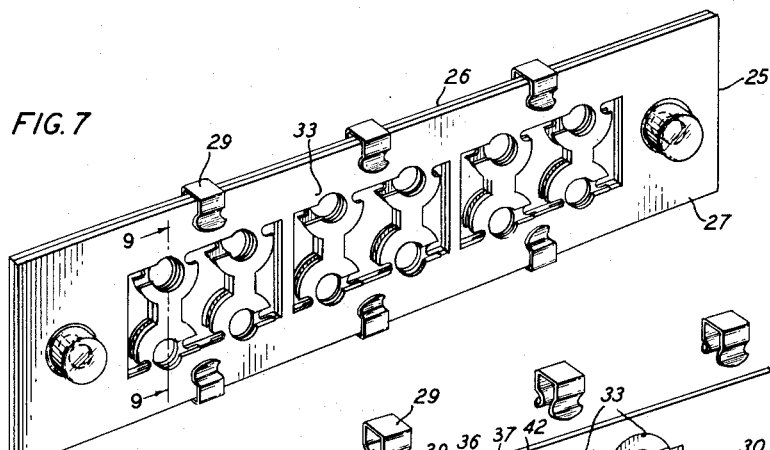
Fig. 7 is a perspective view of a preferred form of mask for a plurality of crystals to which conducting coatings are to be applied.

The details of construction of the mask used in applying the conducting coating are illustrated in Figs. 7 through 10. The mask assembly, indicated generally as 25, is shown in Fig. 7, and comprises a back masking plate 26 and a front masking plate 27, held together by a number of spaced resilient clips 29 fitting over the edges of the plates.

The proper registry between the plates is obtained by forming studs 30 on the back plate 26, and bored studs receiving bosses 31 on the front plate 27.

The back plate 26 is recessed to form snug seats 32 for the crystals to be given conducting coatings. The depth of the recess is made less than the thickness of the crystals to be coated, so that the front plate 27 will fit closely thereagainst. It is important that such a tight fit be obtained, so that there will be no spreading of the coating beyond the edges of the intended area, which are sharply defined by the mask openings.

The mask openings are so related in the appropriate or offset register as to accomplish a dual purpose. They must allow for the application of the conducting coatings 13, which include central coating areas 34 and connecting tabs 35 extending therefrom toward the edges of the crystal and over the helical portions 4 of the mounting wires. The central coating areas 34 on opposite sides of the crystal are in exact registry or alignment, but the associated connecting tabs 35 are offset, or extend therefrom in diametrically opposite directions. In addition, the mask must be cut out or recessed to allow for the upper helical portions 4 of the mounting wires and to accommodate a plurality of crystal units with clearance portions sufficient to prevent mutual interference between the lower helical portions 12 of the mounting wires.

Figure 8:
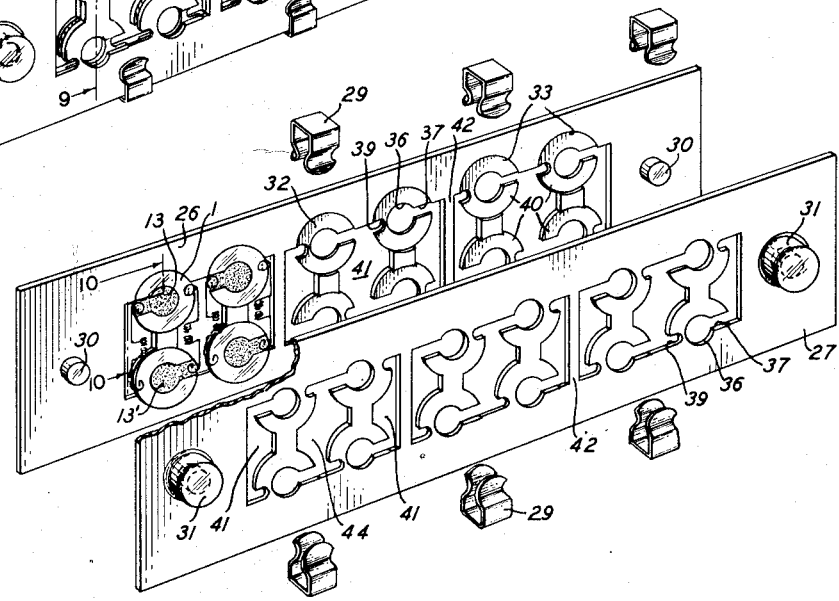
Fig. 8 is a perspective view of the mask of Fig. 7, exploded to show the relation of the parts and the manner of positioning crystals therein.

The first purpose is accomplished by associating with each of the crystal-receiving positions indicated generally as 33 in Fig. 8 in a central coating port 36 and a connecting tab port 37 communicating therewith. A clearance port 39 is disposed adjacent each central coating port 36, diametrically opposite connecting tab port 37, to allow entry of the appropriate mounting support helical portion 4. The second purpose is accomplished by arranging the crystal-receiving positions 33 in groups, indicated generally as 40, consisting of two pairs of adjacent positions 33, so that the mounting wires of the crystals to be seated therein may be presented toward the longer center line of the mask. Supporting wire-receiving side cut-out portions 41 extend transversely of mask 25 beside each group 40 of four positions 33, and adjacent groups are separated by dividing strip portions 42 of the mask. A supporting wire-receiving central cut-out portion 44 is disposed between each of four positions 33 in the group 40.

Figure 9:
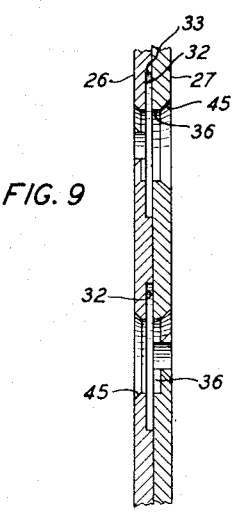
Fig. 9 is a sectional view of the mask taken as indicated by line 9—9 of Figure 7.

In Fig. 8, crystals 1 which have been processed to the stage shown in Fig. 4 are shown seated in two of the crystal positions 33. A cross section of two of the crystal positions 33, taken as indicated by line 9—9 of Fig. 7, is shown in Fig. 9, and in Fig. 10, crystals 1 with mounting wires 5 attached, are shown seated in the back plate 26 as in Fig. 8. Fig. 9 also shows chamfers 45 which are formed around coating ports 36, 37 and 39 in order that the coating material may impinge on the crystal from a wide angle, and not be shaded from the crystal by the extension of the edges of the apertures into the path of the material being applied.

It will be observed that the proportionate dimensions are such that the cut-out wire-receiving portions 41 and 44, provide adequate space for the mounting wires 5 and their upper and lower helical portions 4 and 12, so that they are protected from injury while being handled in the mask.

It will be obvious that other geometrical arrangements of the mask openings may be made, but that shown is a simple and convenient grouping for accommodating a number of crystals without interference. A greater number of crystals could be coated simultaneously by expanding the mask, adding successive groups of positions, but the size shown, which will hold twelve at once, has proved to be very practical.

From the above discussion, it may be seen that a form of crystal unit has been presented and techniques and equipment necessary for its production have been described, so that piezoelectric crystal units may be made for operation at temperatures around 200° C. Since in this region previously known crystal units and production methods have been incapable of successful utilization, the field of usefulness of the piezoelectric crystal has been extended.

What is claimed is:

1. The combination, in a crystal unit having a mounting base, contact pins fixed therethrough and insulated therefrom, and resilient supporting and connecting means, of a piezoelectric crystal, and means for securing said crystal to said supporting and connecting means and for suppressing unwanted resonances, comprising a conducting ceramic paste fused to said crystal and about said supporting and connecting means.

2. A crystal unit for operation at precise frequencies at elevated temperatures including 200° C., comprising a coated piezoelectric crystal having a substantially zero temperature coefficient of frequency at said temperatures; mounting means secured to said crystal resiliently by ceramic base conducting paste effective to maintain a solid joint therewith and to provide controlled damping at said temperatures, and means for enclosing said crystal having a seal effective at said temperatures.

3. A crystal unit for use at precise frequencies at an elevated range of temperatures including 200° C., comprising a crystal having substantially zero temperature coefficient over said elevated range of temperatures, supporting means secured resiliently to said crystal, ceramic means effective over said elevated range of temperatures to form a permanent electrical and mechanical joint between said supporting means and said crystal and to provide a controlled amount of damping; a base, connecting terminal means sealed hermetically through said base, a resilient connection between said supporting means and said connecting terminal means; and a cover fitting over said crystal and hermetically sealed to said base by means effective through said elevated range of temperatures.

4. The method of assembling a crystal unit incorporating a piezoelectric crystal, a base having contact terminals sealed therethrough, resilient means for connecting said terminals to opposite sides of said crystal, and an enclosure adapted to fit over said crystal onto said base, which comprises resiliently attaching to said crystal said means for connecting said terminals to said crystal, applying to the portion of said crystal engaged by said means a conducting ceramic paste which, on being subjected to an elevated temperature, will fuse with, and form a permanent bond between said crystal and said means for connecting said terminals to said crystal, subjecting said crystal, said resilient means for connecting said terminals to said crystal, and said conducting ceramic paste to a temperature of substantially 1,000° F.; masking said crystal, applying coatings to the masked crystal, resiliently and permanently attaching said means for connecting said terminals to said crystal to said contact terminals, applying said enclosure to said base, effecting a desired change in the atmospheric content of said enclosure, and sealing said enclosure hermetically to said base.

5. The method of assembling a crystal unit incorporating a piezoelectric crystal, a base having contact terminals sealed therethrough, resilient means for connecting said terminals to opposite sides of said crystal, and an enclosure adapted to fit over said crystal onto said base, which comprises applying to said crystal in positions for engagement with said resilient means spotting material which, on being subjected to an elevated temperature, will fuse into, and form a permanent bond with, the surface of said crystal; subjecting said crystal to a temperature sufficient to fuse said spotting material, permitting said crystal to cool, resiliently attaching at said spotted positions said means for connecting said terminals to said crystal; applying over said spotted positions a conducting ceramic paste which, on being subjected to an elevated temperature, will fuse with, and form a permanent bond between said spotting material and said means for connecting said terminals to said crystal; subjecting said crystal, said resilient means for connecting said terminals to said crystal, and said conducting ceramic paste to a temperature of substantially 1,000° F.; masking said crystal, applying coatings to the masked crystal, resiliently and permanently attaching said means for connecting said terminals to said crystal to said contact terminals, applying said enclosure to said base, effecting a desired change in the atmospheric content of said enclosure, and sealing said enclosure hermetically to said base.

6. The method of assembling a crystal unit incorporating a piezoelectric crystal, a base having contact terminals sealed therethrough, resilient means for connecting said terminals to opposite sides of said crystal, and an enclosure adapted to fit over said crystal onto said base, which comprises spotting said crystal with a silver paste in positions for engagement with said resilient means, subjecting said crystal to a temperature of substantally 1,000° F., permitting said crystal to cool, resiliently attaching at said spotted positions said means for connecting said terminals to said crystal, applying over said spotted positions a conducting ceramic paste; subjecting said crystal, said resilient means for connecting said terminals to said crystal, and said conducting ceramic paste to a temperature of substantially 1,000° F.; masking said crystal, applying conducting coatings through said mask to said crystal, resiliently and permanently attaching to said terminals said means for connecting said terminals to opposite sides of said crystal, masking said crystal, applying a loading coating to said crystal while measuring the frequency of oscillation of said crystal, assimilating said enclosure to said base, effecting a desired change in the atmospheric content of said enclosure, and sealing said enclosure hermetically to said base.

7. The method of assembling a crystal unit having a piezoelectric crystal cut to oscillate with a nearly zero temperature coefficient at temperatures of the order of 200° C., a base having contact terminals sealed therethrough and insulated therefrom, connecting means disposed between said crystal and said terminals, and a cover arranged to fit over said crystal onto said base, which comprises applying silver paste spots to portions of said crystal to be engaged by said connecting means, subjecting said crystal to a temperature of the order of 1,000° F., securing said connecting means resiliently to said crystal over the place of application of said silver paste spots, applying thereover a conducting ceramic paste, subjecting said ceramic paste, connecting means, and crystal to a temperature of the order of 1,000° F., masking said crystal, applying conducting coatings to said crystal, securing said connecting means resiliently and permanently to said terminals, applying said cover over said crystal, effecting desired changes in the atmospheric content of said cover, and sealing said cover hermetically to said base.

8. The method of assembling crystal units to be operated at temperatures in the range of 200° C. and above which comprises applying a spot of silver paste to said blank in the positions thereof to be engaged by helical portions of mounting wires, heating said blank and silver spots to a temperature of 1,000° F., assembling mounting wires to said blanks with helical portions thereof engaging said spots, applying a conducting paste suitable for use at high temperatures to said helical portions, firing the assembled crystal mounting wires and conducting paste at 1,000° F., securing said mounting wires to conducting pins in a mounting base, plating said crystal to frequency, applying a cover to the assembly and crimping said cover to said base, evacuating said assembled container, filling said container with dry air, and hermetically sealing said container.

9. A crystal unit having contact pins disposed in a base and a crystal, crystal-supporting means having resilient portions for engaging said contact pins and resilient portions adapted to engage said crystal, and a conducting ceramic paste fusible at an elevated temperature and effective to provide controlled damping and to maintain a good electrical and mechanical joint at temperatures of the order of 200° C. disposed over part of said resilient portions engaging said crystal.

ARTHUR W. WARNER, JR.

References Cited in the file of this patent

UNITED STATES PATENTS

| Number | Name | Date |
|---|---|---|
| 2,225,729 | White | Dec. 24, 1940 |
| 2,371,613 | Fair | Mar. 20, 1945 |
| 2,392,429 | Sykes | Jan. 8, 1946 |
| 2,444,312 | Roberds | June 29, 1948 |
| 2,456,795 | Samuelson | Dec. 21, 1948 |
| 2,457,158 | Koch | Dec. 28, 1948 |
| 2,492,357 | Chatterjea | Dec. 27, 1949 |
| 2,503,429 | Ziegler | Apr. 11, 1950 |
| 2,505,370 | Sykes | Apr. 25, 1950 |
| 2,513,870 | Hoffman | July 4, 1950 |
| 2,546,321 | Ruggles | Mar. 27, 1951 |